US008824281B2

(12) United States Patent
Ramakrishnan et al.

(10) Patent No.: US 8,824,281 B2
(45) Date of Patent: Sep. 2, 2014

(54) NETWORK-FRIENDLY TRANSMISSION CONTROL PROTOCOL (TCP) METHODS, APPARATUS AND ARTICLES OF MANUFACTURE

(75) Inventors: Kadangode K. Ramakrishnan, Berkeley Heights, NJ (US); Mayutan Arumaithurai, Goettingen (DE); Xiaoming Fu, Goettingen (DE)

(73) Assignee: AT&T Intellectual Property I, L.P., Atlanta, GA (US)

( * ) Notice: Subject to any disclaimer, the term of this patent is extended or adjusted under 35 U.S.C. 154(b) by 407 days.

(21) Appl. No.: 12/948,432

(22) Filed: Nov. 17, 2010

(65) Prior Publication Data
US 2012/0120801 A1 May 17, 2012

(51) Int. Cl.
*H04L 1/00* (2006.01)
*H04L 12/28* (2006.01)
*H04J 3/16* (2006.01)

(52) U.S. Cl.
USPC ............................ 370/229; 370/412; 370/468

(58) Field of Classification Search
USPC ........................ 370/229–238, 412, 413, 468
See application file for complete search history.

(56) References Cited

U.S. PATENT DOCUMENTS

| 6,222,856 | B1 | 4/2001 | Krishnan et al. |
| 6,266,322 | B1 | 7/2001 | Berger et al. |
| 6,343,085 | B1 | 1/2002 | Krishnan et al. |
| 6,400,684 | B1 | 6/2002 | Benmohamed et al. |
| 7,180,858 | B1 * | 2/2007 | Roy et al. ........................ 370/229 |
| 7,277,446 | B1 * | 10/2007 | Abi-Nassif et al. ............ 370/412 |
| 7,616,585 | B1 | 11/2009 | Kritov et al. |
| 7,885,185 | B2 * | 2/2011 | van den Berg et al. ........ 370/230 |
| 2003/0023758 | A1 * | 1/2003 | Yoshikawa et al. ............ 709/247 |
| 2004/0190449 | A1 * | 9/2004 | Mannal et al. ................. 370/229 |
| 2004/0196785 | A1 | 10/2004 | Janakiraman et al. |
| 2007/0165524 | A1 * | 7/2007 | Mascolo ......................... 370/230 |
| 2007/0165531 | A1 * | 7/2007 | Labrador et al. ............... 370/235 |
| 2009/0016240 | A1 | 1/2009 | Sebastian |
| 2009/0154356 | A1 * | 6/2009 | Wiemann et al. .............. 370/236 |
| 2011/0007630 | A1 * | 1/2011 | Almhana et al. ............... 370/230 |

OTHER PUBLICATIONS

S. Floyd, M. Allman, A. Jain, and P. Sarolahti, "Quick-Start for TCP and IP," RFC 4782, Jan. 2007. (78 pages).
D. Katabi, M. Handley, and C. Rohrs, "Congestion Control for High Bandwidth-delay Product Networks," in Proc. SIGCOMM, 2002. (14 pages).
H. Xie, R. Yang, A. Krishnamurthy, Y. Liu, and A. Silberschatz, "P4p: Portal for (p2p) applications," in Proc. SIGCOMM, 2008. (12 pages).
J. Seedorf and E. Burger, "Application-Layer Traffic Optimization (ALTO) Problem Statement," RFC 5693, Oct. 2009. (14 pages).
M. Gerla, M. Y. Sanadidi, R. Wang, A. Zanella, "TCP Westwood: Congestion Window Control Using Bandwidth Estimation," in Proc. IEEE Globecom 2001. (8 pages).

(Continued)

*Primary Examiner* — Xavier Szewai Wong
(74) *Attorney, Agent, or Firm* — Hanley, Flight & Zimmerman, LLC

(57) ABSTRACT

Example methods, apparatus and articles of manufacture to route policy requests are disclosed. A disclosed example method includes sending bandwidth probe packets at a probing rate, receiving a packet containing an indication representative of whether the probe packets triggered congestion, and selecting a transmission rate for sending data packets based on the probing rate and the indication.

18 Claims, 6 Drawing Sheets

(56) References Cited

OTHER PUBLICATIONS

M. Alizadeh, A. Greenberg, D. Maltz, J. Padhye, P. Patel, B. Prabhakar, S. Sengupta, and M. Sridharan, "DCTCP: Efficient Packet Transport for the Commoditized Data Center," in Proc. SIGCOMM, 2010. (15 pages).

I. Qazi and T. Znati, "On the Design of Load Factor based Congestion Control Protocols for Next-Generation Networks," in Proc. INFOCOM, 2008. (9 pages).

N. Dukkipati, N. McKeown, and G. Fraser, "RCP-AC: Congestion Control to make flows complete quickly in any environment," in Proc. High-Speed Networking Workshop, 2006. (3 pages).

K. Ramakrishnan, S. Floyd, and D. Black, "The Addition of Explicit Congestion Notification (ECN) to IP," RFC 3168, Sep. 2001. (60 pages).

A. Kuzmanovic and E. Knightly, "TCP-LP: A Distributed Algorithm for Low Priority Data Transfer," in Proc. INFOCOM, 2003. (11 pages).

S. Shalunov and G. Hazel, "Low Extra Delay Background Transport (LEDBAT)," Jul. 12, 2010, work in progress. (19 pages).

Y. Xia, L. Subramanian, I. Stoica, and S. Kalyanaraman, "One More Bit is Enough," IEEE/ACM Transactions on Networking, 2008. (15 pages).

I. Qazi, T. Znati, and L. Andrew, "Congestion Control using Efficient Explicit Feedback," in Proc. INFOCOM, 2009. (9 pages).

R. Jain, "A Delay-Based Approach for Congestion Avoidance in Interconnected Heterogeneous Computer Networks," SIGCOMM Comput. Commun. Rev., 1989. (16 pages).

L. S. Brakmo, S. W. O'Malley, and L. L. Peterson, "TCP Vegas: New Techniques for Congestion Detection and Avoidance," in Proc. ACM SIGCOMM '94, 1994, pp. 24-35. (12 pages).

K. Tan and J. Song, "Compound TCP: A scalable and TCP-Friendly Congestion Control for High-speed Networks," in 4th International workshop on Protocols for Fast Long-Distance Networks (PFLDNet), 2006. (8 pages).

J. Martin, A. Nilsson, and I. Rhee, "Delay-Based Congestion Avoidance for TCP," IEEE/ACM Transactions on Networking, vol. 11, No. 3, pp. 356-369, Jun. 2003. (14 pages).

S. Biaz and N. H. Vaidya, "Is the Round-trip Time Correlated with the Number of Packets in Flight?" in Proc. IMC, 2003. (6 pages).

R. J. La, J. Walrand, and V. Anantharam, "Issues in TCP Vegas," Technical Report, EECS Dept, UC Berkeley, 2001. (17 pages).

C. Jin, D. Wei, and S. Low, "Fast TCP: Motivation, Architecture, Algorithms, Performance," in Proc. INFOCOM, 2004. (12 pages).

S. Floyd, "HighSpeed TCP for Large Congestion Windows," RFC 3649, Dec. 2003. (33 pages).

S. Ha, I. Rhee, and L. Xu, "CUBIC: A New TCP-Friendly High-Speed TCP Variant," SIGOPS Oper. Syst. Rev., 2008. (11 pages).

V. Konda and J. Kaur, "RAPID: Shrinking the Congestion-Control Timescale," in Proc. INFOCOM, 2009. (9 pages).

V. J. Ribeiro, R. H. Riedi, R. G. Baraniuk, J. Navratil, and L. Cottrell, "PathChirp: Efficient Available Bandwidth Estimation for Network Paths," in Proc. Passive and Active Measurement Workshop, 2003. (11 pages).

S. Floyd and V. Jacobson, "Random Early Detection Gateways for Congestion Avoidance," IEEE/ACM Trans. on Netw., Jan. 1993. (22 pages).

S. Shalunov, "Low Extra Delay Background Transport (LEDBAT)," Mar. 4, 2009, work in progress. (12 pages).

M. Arumaithurai, X. Fu, and K. K. Ramakrishnan, "NF-TCP: Network Friendly TCP," in Proc. LANMAN, 2010. (6 pages).

* cited by examiner

NETWORK-FRIENDLY TRANSMISSION CONTROL PROTOCOL (TCP) METHODS, APPARATUS AND ARTICLES OF MANUFACTURE

FIELD OF THE DISCLOSURE

This disclosure relates generally to Internet protocol (IP) networks, and, more particularly, to network-friendly transmission control protocol (TCP) methods, apparatus and articles of manufacture.

BACKGROUND

Today, Internet-based applications may be broadly classified into delay-sensitive and delay-insensitive applications. Typical users have higher expectations and less tolerance for delays for delay-sensitive applications such as video conferencing, video streaming, voice over IP (VoIP) and/or web-browsing than for delay-insensitive applications. However, delay-insensitive applications such as software updates, download and play, and/or peer-to-peer (P2P) file sharing represent an increasing portion of Internet traffic. According to some studies, P2P now accounts for between 43% and 70% of the IP traffic in large parts of Europe, Middle East, Africa and South America.

DETAILED DESCRIPTION

Figure 1:
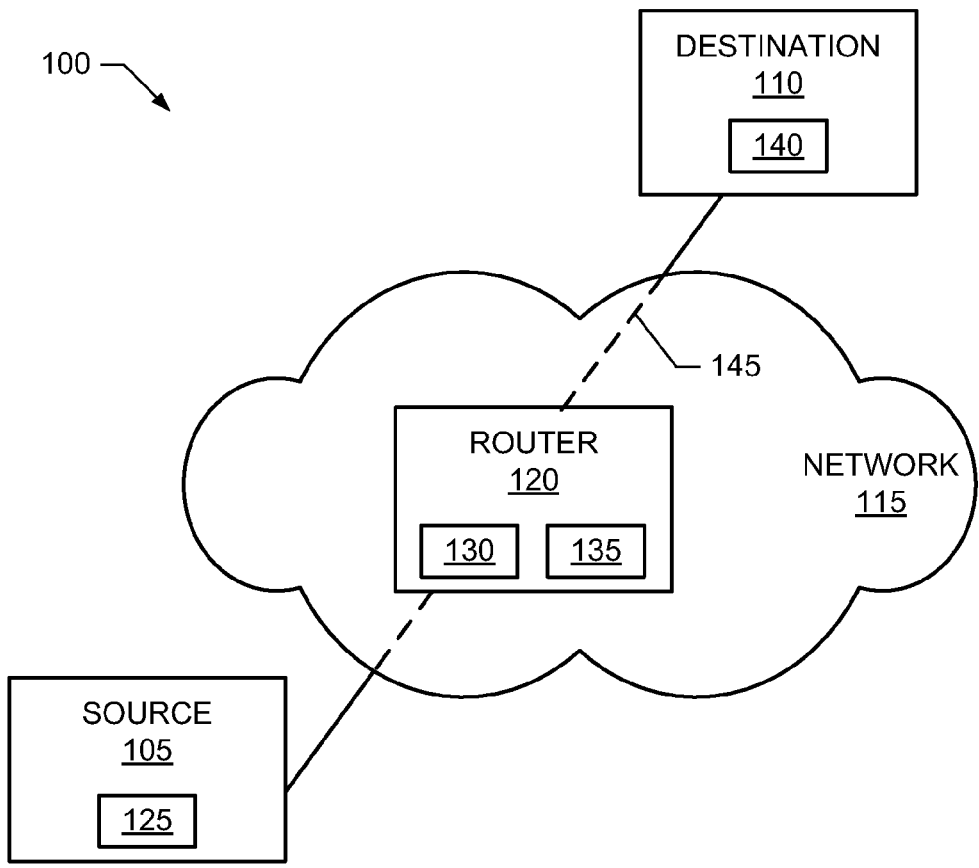
FIG. 1 is a schematic illustration of an example communication system implemented in accordance with the teachings of this disclosure.

Delay-insensitive applications such as peer-to-peer (P2P) file sharing, download and play, data center backups, software updates, etc. can generate substantial amounts of network traffic. This traffic, which may be transported over multiple simultaneous transmission control protocol (TCP) connections, competes with the traffic associated with interactive and/or delay-sensitive applications. With traditional TCP-based methods, delay-insensitive and delay-sensitive applications compete on an equal footing for data transmission bandwidth. Delay-insensitive and delay-sensitive applications may open one or more TCP connections that compete for bandwidth. In many cases, delay-insensitive applications open multiple TCP connections, thereby obtaining more throughput than a delay-sensitive application that opens only a single TCP connection. Thus, delay-insensitive applications can result in a lack of fairness and/or result in unacceptable latencies for delay-sensitive applications having more stringent performance objectives. To overcome at least these deficiencies, example network-friendly TCP (NF-TCP) methods, apparatus and articles are disclosed that enable delay-insensitive applications to be responsive to available bandwidth. The NF-TCP examples described herein quickly and efficiently utilize available bandwidth during congestion-free time periods, and back-off more quickly and aggressively than standard TCP in the face of imminent congestion. In some examples, explicit congestion notification (ECN) based congestion detection techniques are used to measure available bandwidth, detect congestion in the network, and trigger congestion avoidance mechanisms in the end-systems.

Example NF-TCP methods, apparatus and articles of manufacture are disclosed. A disclosed example method includes sending bandwidth probe packets at a probing rate, receiving a packet containing an indication representative of whether the probe packets triggered congestion, and selecting a transmission rate for sending data packets based on the probing rate and the indication.

A disclosed example apparatus includes a bandwidth estimator to send probe packets at a probing rate, a congestion detector to receive a packet including an indication representative of whether the probe packets triggered congestion, and a flow rate controller to select a transmission rate for sending data packets based on the probing rate and the indication.

Another disclosed example method includes determining a packet type of a received packet, and when the packet type comprises a probe packet type and a first queue depth is exceeded, marking the packet as triggering congestion, and when the packet type comprises a network-friendly data flow packet type and a second queue depth different from the first queue depth is exceeded, marking the packet as triggering congestion.

A disclosed example router includes a processor and a tangible computer-readable medium storing machine-readable instructions that, when executed, cause the processor to at least determine a packet type of a received packet, when the packet type comprises a probe packet type and a first queue depth is exceeded, mark the packet as triggering congestion, and when the packet type comprises a network-friendly data flow packet type and a second queue depth different from the first queue depth is exceeded, mark the packet as triggering congestion.

FIG. 1 illustrates an example communication system 100 that is configured to implemented NF-TCP as described herein. In the illustrated example of FIG. 1, a source node 105 is communicatively coupled to a destination node 110 via a network 115. In examples disclosed herein, the example node 105 of FIG. 1 sends data to the example node 110. Thus, for simplicity of discussion, in these examples the example node 105 is referred to as a "source node" and the example node 110 is referred to as a "destination node." However, the node 105 may be a "destination node" for other transmissions, and the node 110 may be a "source node" for the same or still other transmissions. Moreover, the example nodes 105 and 110 of FIG. 1 may participate in multiple transmissions (sequentially and/or in parallel) in which their role as source and destination may differ and/or vary.

While, for ease of explanation and illustration, a single source node 105 and a single destination node 110 are depicted in FIG. 1, the example communication system 100 may include any number and/or type(s) of additional source nodes and destination nodes. Moreover, while a single network 115 is illustrated in FIG. 1, the communication system 100 may include any number and/or type(s) of private and/or public networks. Example nodes 105, 110 include, but are not limited to, a personal computer (PC), a workstation, a residential gateway, a set-top box, a smartphone, a laptop, a netbook, a tablet PC, a game console, a server, and/or any other type of computing device containing a processor. In some examples, the network 115 is a public network such as the Internet.

The example network 115 of FIG. 1 includes any number and/or type(s) of router(s). Data or traffic such as TCP packets exchanged between the nodes 105 and 110 are routed through the network 115 by the router(s) 120. While, for ease of explanation and illustration, a single router 120 is depicted in FIG. 1, the example network 115 of FIG. 1 will typically include more than one router of the same and/or different make(s) and/or model(s). When multiple routers 120 are implemented, any or all of the routers 120 that carry packets between the example source node 105 and the example destination node 110 may implement the example congestion detection module 130 described herein. In some examples, the router 120 comprises an enhanced active queue management (AQM) enabled router that is capable of marking packets associated with NF-TCP flows using a different threshold than the threshold used to mark non NF-TCP flows to prevent the NF-TCP flows from contributing to queue buildup.

Figure 2:
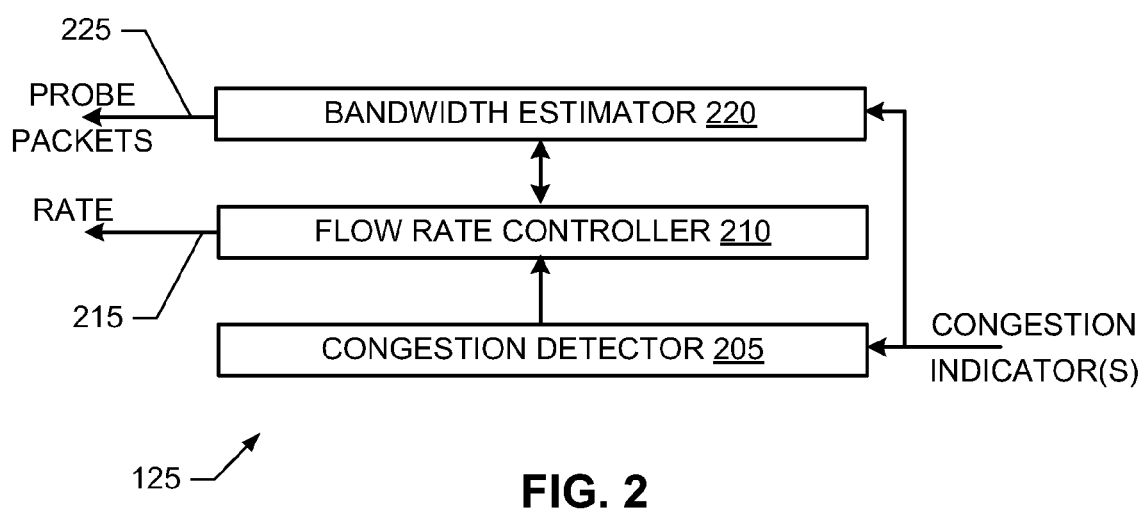
FIG. 2 illustrates an example manner of implementing the example network-friendly TCP module of FIG. 1.
Figure 3:
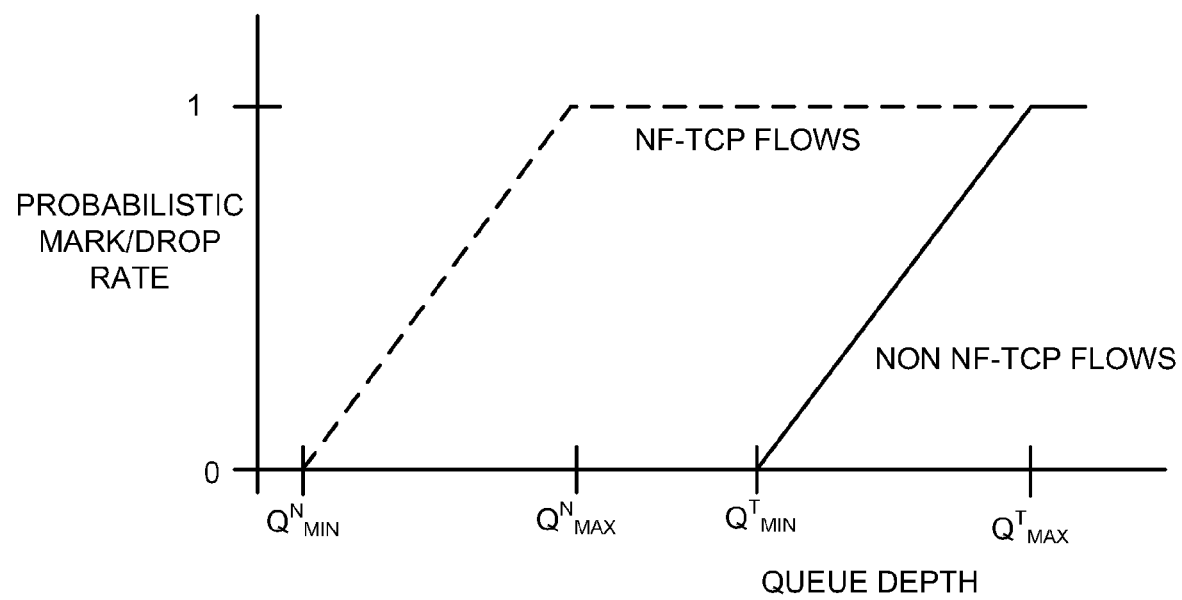
FIG. 3 illustrates example probabilistic packing marking/dropping rates as a function of threshold and queue depth.
Figure 4:
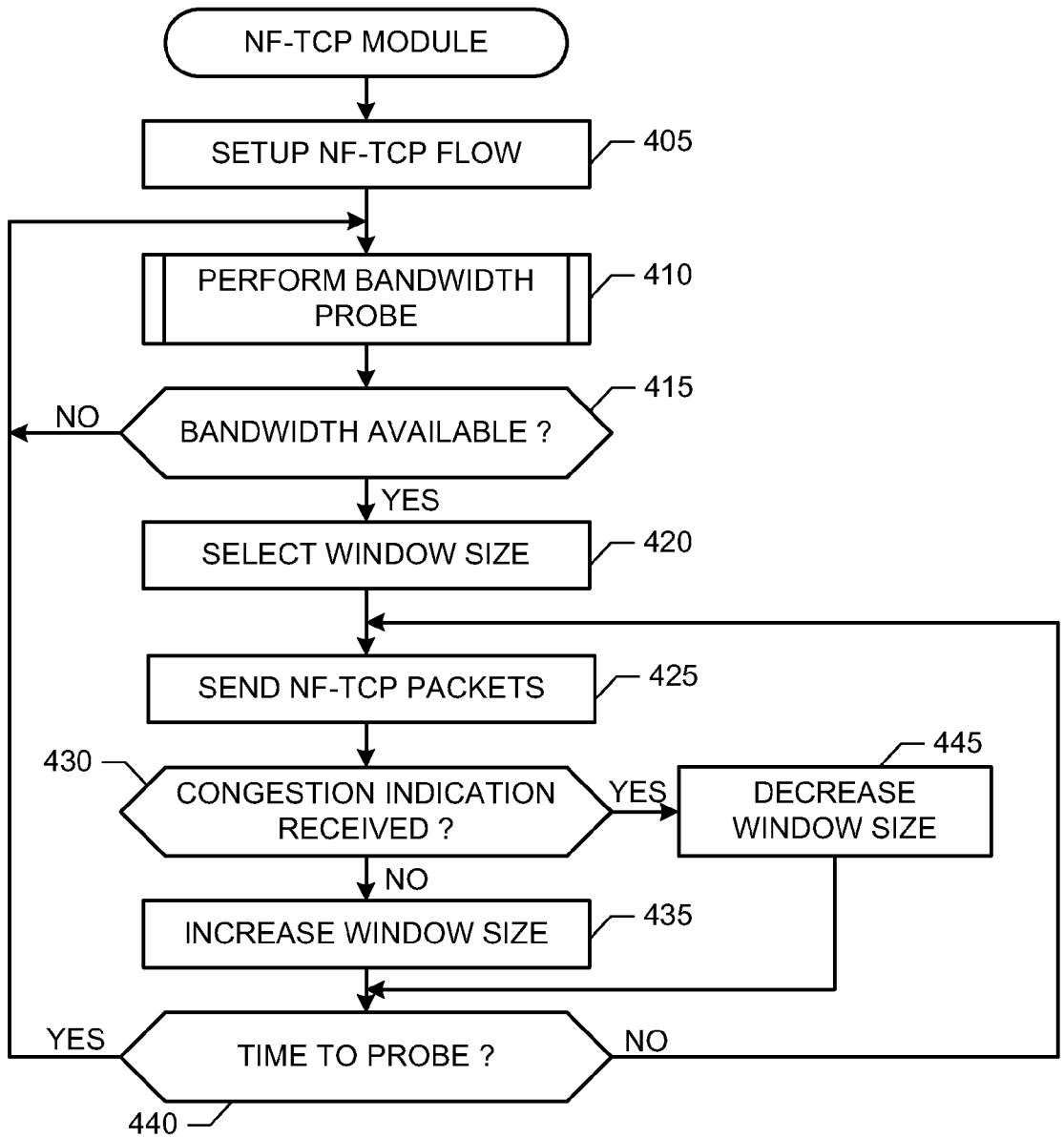
FIGS. 4 and 5 are flowcharts representing example processes that may be embodied as machine-accessible instructions and executed by, for example, one or more processors to implement the example network-friendly TCP module of FIG. 1.
Figure 5:
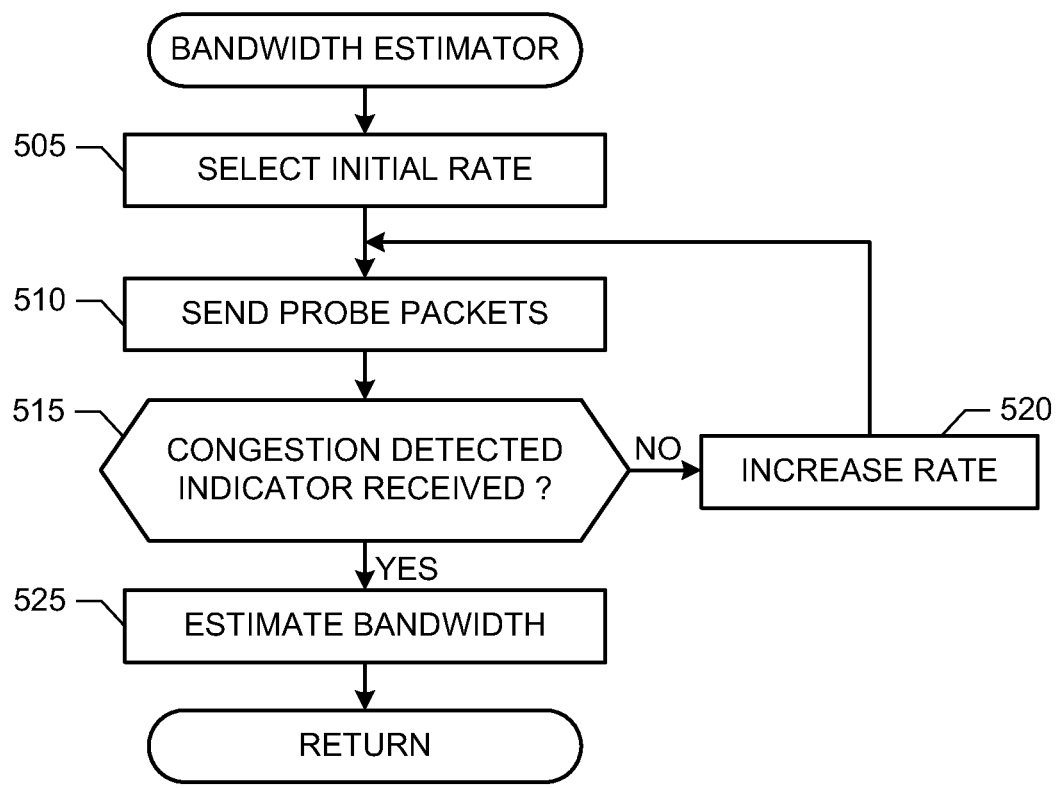
Figure 6:
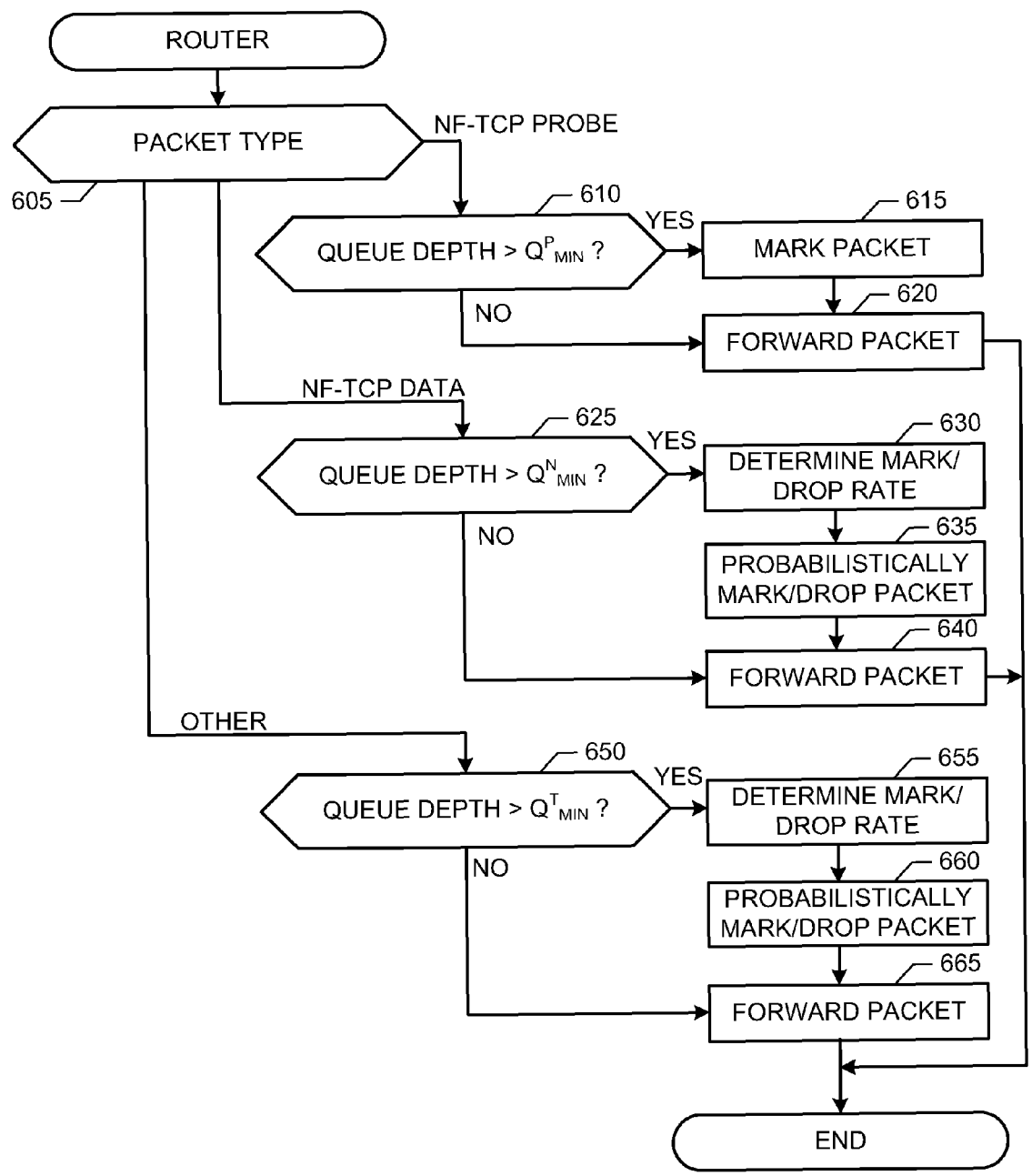
FIG. 6 is a flowchart representing an example process that may be embodied as machine-accessible instructions and executed by, for example, one or more processors to implement the example congestion detection module of FIG. 1.

To implement NF-TCP, the example source node 105 of FIG. 1 implements a NF-TCP module 125, the example router 120 implements the example congestion detection module 130 and a queue 135, and the example destination node 110 implements a congestion notification module 140. An example manner of implementing the example NF-TCP module 125 of FIG. 1 is shown in FIG. 2. Flowcharts representing example machine-accessible instructions that may be carried out to implement the example NF-TCP module 125 are illustrated in FIGS. 3-5. A flowchart representing example machine-accessible instructions that may be carried out to implement the example congestion detection module 130 is illustrated in FIG. 6. In some examples, the queue 135 comprises a first in first out (FIFO) queue that implements the random early detection (RED) method of an enhanced AQM enabled router 120 to detect congestion. In such examples, the AQM enabled router 120 monitors the average depth of the queue 135 and drops or, when used in conjunction with ECN, marks packets based on statistical probabilities. When the queue 135 is almost empty, all incoming packets are accepted. As the depth of the queue 135 increases, the probability of dropping an incoming packet increases. The incoming packets are dropped or marked on a random basis according to the probability. When the queue 135 is full, all incoming packets are dropped or marked.

As packets associated with a NF-TCP flow (i.e., NF-TCP packets) and/or a non NF-TCP flow (i.e., non NF-TCP packets) are received at the example router 120 from the example source node 105, the example congestion detection module 130 of FIG. 1 monitors the state of the queue 135 (e.g., the number of packets currently in the queue 135) to detect, determine and/or estimate the amount of congestion associated with the router 120. When congestion is detected by the congestion detection module 130, the example congestion detection module 130 sets, for example, an ECN value (e.g., the Internet Protocol (IP) CONGESTION_DETECTED header flag) in the header(s) of the outgoing IP packets of such flows. For example, the congestion detection module 130 can compare the number of packets contained in the queue 135 to one or more thresholds to detect congestion and/or the potential onset of congestion.

To enable the example source node 105 to respond to the detection of congestion and/or the onset of congestion, the example congestion detection module 130 of FIG. 1 uses four congestion detection thresholds $Q^N_{min}$, $Q^N_{max}$, $Q^T_{min}$, and $Q^T_{max}$. Preferably the first threshold $Q^N_{min}$ is selected to be lower than the third threshold $Q^T_{min}$. When the total number of packets (NF-TCP and non NF-TCP) present in the queue 135 is less than the first threshold $Q^N_{min}$, the CONGESTION_DETECTED flags of the outgoing NF-TCP packets are left unset (e.g., have a value of zero). However, when a NF-TCP packet is received with a set CONGESTION_DETECTED flag, the CONGESTION_DETECTED flag will not be modified by the congestion detection module 130. In such instances, an upstream router may have detected the onset of congestion at that router and set the CONGESTION_DETECTED flag. In some examples, the second example threshold $Q^N_{max}$ is selected to be approximately half the size of the queue 135. When the depth of the queue 135 exceeds the second threshold $Q^N_{max}$, all NF-TCP packets are marked and/or dropped by the example router 120. When the depth of the queue 135 exceeds the first threshold $Q^N_{min}$ but is less than the second threshold $Q^N_{max}$, the example congestion detection module 130 probabilistically sets the CONGESTION_DETECTED header flag of any outgoing NF-TCP packets to, for example, a value of one. The probability at which the outgoing NF-TCP packets are marked/dropped increases as the depth of the queue increases from the first threshold $Q^N_{min}$ to the second threshold $Q^N_{max}$, as shown in FIG. 3.

As shown in FIG. 3, non NF-TCP packets will not have their CONGESTION_DETECTED flag set unless the number of packets (NF-TCP and non NF-TCP) present in the queue 135 exceeds the third threshold $Q^T_{min}$. When the depth of the queue 135 exceeds the fourth threshold $Q^N_{max}$, all packets are dropped and/or have their CONGESTION_DETECTED flag set. In some examples, the first congestion detection threshold $Q^N_{min}$ is selected to have a value corresponding to the bandwidth delay product to enable an early response to congestion while reducing responses to short-term transients. Example threshold values for a link having a maximum transmission data rate of 600 million bits per second (Mbps) and an upper bound on the RTT of 100 milliseconds are $Q^N_{min}=75$ packets (or 1% of queue size), $Q^N_{max}=3750$ packets (or 50% of queue size), $Q^T_{min}=6800$ packets (or 90% of queue size), and $Q^T_{max}=7500$ packets (or 100% of queue size).

As described below, to enable measurement and/or estimation of available bandwidth, the example congestion detection module 130 of FIG. 1 uses an additional threshold value $Q^P_{min}$ for NF-TCP bandwidth probe packets 225 (FIG. 2). When the total number of packets (NF-TCP and non NF-TCP) in the example queue 135 exceeds a very small value $Q^P_{min}$ (e.g., one), the congestion detection module 130 sets the CONGESTION_DETECTED flag of any outgoing NF-TCP bandwidth probe packets, if they weren't previously set by an upstream router. In some examples, NF-TCP bandwidth probe packets are marked based on the instantaneous queue size exceeding the $Q^P_{min}$ threshold. NF-TCP packets are marked/dropped based on the average queue size exceeding the $Q^N_{max}$ or $Q^T_{min}$ thresholds. Any number and/or type(s) of averaging method(s), algorithm(s) and/or technique(s) such exponentially weighted moving average (EWMA) implemented by the RED method may be used to determine an average queue size When the example destination node 110 of FIG. 1 receives a packet (e.g., a NF-TCP packet, a non NF-TCP packet, and/or a NF-TCP bandwidth probe packet) with its CONGESTION_DETECTED flag set, the example congestion notification module 140 of FIG. 1, indicates the detected congestion to the source node 105 by setting the CONGES- TION_DETECTED flag in the corresponding response packet (e.g., a TCP acknowledgement (ACK) packet) sent by the destination node 110 to the source node 105 to acknowledge receipt of the packet.

To detect congestion, the example NF-TCP module 125 of FIG. 1 includes a congestion detector 205 (FIG. 2). The example congestion detector 205 of FIG. 2 receives indications of detected congestion from the destination node 110. Example congestion detected indications are CONGESTION_DETECTED flags received in ACK packets sent by the destination node 110 to the source node 105. When a received indicator indicates that NF-TCP packets encountered congestion, the example congestion detector 205 notifies a flow rate controller 210 of the detected congestion condition.

To respond to the onset of congestion, the example NF-TCP module 125 of FIG. 2 includes the example flow rate controller 210. When the detection of congestion is signaled by the destination node 110, the example flow rate controller 210 of FIG. 2 reduces the rate 215 at which the source node 105 sends NF-TCP packets. The example flow rate controller 210 reduces the rate 215 by adjusting or selecting the TCP congestion window size w. The window size w represents the maximum number of packets that the source can have outstanding in the network without being acknowledged. This maximum number is upper-bounded by the advertised window size of the destination node 110, which is the number of packets the destination is willing to buffer for the TCP flow from the source node 105. The source node 105 can send only up to that number of packets before it waits for an acknowledgment from the destination node 110. A larger window size w results in a net increase in packet transmission rate 215 by the source node 105. In some examples, the flow rate controller 210 reduces the window size w to zero. Alternatively, to promote fairness among NF-TCP flows, the flow rate controller 210 of some examples reduces the window size w by a percentage of the current window size. For example, the flow rate controller 210 may reduce the window size using the following mathematical expression:

$$w = w - b*w \qquad \text{EQN (1)}$$

where b is a scale factor. The value of b may be selected to adjust the submissiveness of NF-TCP flows. A larger value of b results in a larger decrease in window size w and, thus, a larger decrease in the rate 215. Thus, a larger value of b results in NF-TCP flows being more submissive to non NF-TCP flows. A larger value of b may also result in lower utilization of the network 115 because the NF-TCP flows may have decreased their rates 215 more than necessary. However, a smaller value of b may keep the rate 215 of a new NF-TCP flow from becoming similar to already ongoing NF-TCP flows. Thus, too small of a value of b results in it taking longer for NF-TCP flows to obtain fairness with other NF-TCP flows. Traditional TCP uses b=50%. However, experiments have shown that a lower value of b (e.g., b=12.5%) results in sufficient submissiveness of NF-TCP flows to non NF-TCP flows without causing under utilization of the network 115.

As each ACK packet is received for a NF-TCP flow that does not indicate congestion was detected and/or triggered, the example flow rate controller 210 increases the rate 215 at which the source node 105 sends NF-TCP packets. To promote fairness among NF-TCP flows, the example flow rate controller 210 increases the rate 215 by increasing the TCP congestion window size w by a fixed or pre-determined amount such as one packet. Alternatively, the window size w could be increased by a percentage of the window size w, when fairness among NF-TCP flows is not required and/or desired.

To measure, detect and/or estimate the available bandwidth for NF-TCP flows, the example NF-TCP module 125 includes a bandwidth estimator 220. The example bandwidth estimator 220 of FIG. 2 sends NF-TCP bandwidth probe packets 225 at differing rates to measure and/or estimate the available bandwidth. For example, the bandwidth estimator 220 can send the NF-TCP bandwidth probe packets 225 with different inter-packet spacing to emulate sending NF-TCP packets at different rates. Because the example congestion detection module 130 of FIG. 1 uses the threshold $Q^p_{min}=1$ for the NF-TCP bandwidth probe packets 225, when the sending rate for the probe packets 225 exceeds the maximum rate at which the router 120 can send packets, the probe packets 225 will collect in the queue 135 and, thus, experience self-induced congestion. In some examples, the NF-TCP bandwidth probe packets 225 are identified by setting a specific value in the differentiated services control point (DSCP) bit in the header of the packets 225. Additionally or alternatively, NF-TCP data packets could have their DSCP bit set and be used as NF-TCP bandwidth probing packets to reduce the effect of the probing packets 225 on overall network utilization.

The example bandwidth estimator 220 of FIG. 2 sends N of the NF-TCP bandwidth probe packets 225 with varying inter-packet spacing or spread factor SF to enable the measurement of available bandwidth in the range of MinRate to MaxRate. The estimate of the available bandwidth $BW_{est}$ depends on MinRate, the spread factor SF and the number of packets N. The estimate of the available bandwidth $BW_{est}$, Min rate and MaxRate are expressed in bits per second (bps). The $i^{th}$ probe rate $r_i$ can be expressed mathematically as $$r_i = \text{MinRate} * SF^{i-1}. \qquad \text{EQN (2)}$$

MaxRate can be expressed mathematically as $$\text{MaxRate} = \text{MinRate} * SF^{N-2}. \qquad \text{EQN (3)}$$

The example bandwidth estimator 220 of FIG. 2 begins an initial bandwidth probing at a low rate (e.g., 2 packets per TCP congestion window) and successively doubles the bandwidth probing rate until either N packets have been sent or the estimated bandwidth $BW_{est}$ exceeds MaxRate. In some examples, the example bandwidth estimator 220 does not begin the initial bandwidth probing until an acknowledgement for initial NF-TCP data packets is received and there are no packet loss and/or congestion detected markings received. The estimated bandwidth $BW_{est}$ may be computed using the appropriate one of the following mathematical expressions:

$$BWest = \text{MinRate} * SF^{N-1} \text{ if } BW_{avail} > \text{MaxRate} \qquad \text{EQN (4)}$$

$$BWest = \text{MinRate} * SF^{N-k} \text{ if } \text{MinRate} < BW_{avail} < \text{MaxRate} \qquad \text{EQN (5)}$$

$$BWest = 0 \text{ if } BW_{avail} < \text{MinRate} \qquad \text{EQN (6)}$$

where N is the number of probe packets sent, and k is the first packet in the series of probe packets 225 that arrives at the destination node 110 with its CONGESTION_DETECTED flag set and/or with an increased delay relative to the preceding probe packets 125, and $BW_{avail}$ is the physical bandwidth of the communication link 145 (FIG. 1). In some examples, N=15 and a spread factor SF=1.2 are used.

After each bandwidth estimation, the example bandwidth estimator 220 of FIG. 2 waits a uniformly distributed time period having a mean value equal to that of the RTT and then re-estimates the available bandwidth estimate $BW_{est}$. For each new estimate, the bandwidth estimator 220 computes a new starting probe rate MinRate based on the most recently computed estimated bandwidth $BW_{est}$. For example, the bandwidth estimator 220 may compute the new starting probe rate MinRate using the following mathematical expression:

$$MinRate = \frac{SF^{N-1} - 1}{(N-1)(SF-1)SF^{N-2}} \beta * BW_{est} \quad \text{EQN (7)}$$

where $\beta$ is a scale factor having an example value of $\beta=0.5$.

After the bandwidth estimator 220 updates, computes, measures and/or estimates the estimated bandwidth $BW_{est}$, the example flow rate controller 210 of FIG. 2 adjusts the rate 215 at which the source node 105 sends NF-TCP packets to aggressively utilize the available bandwidth of the network 115. The rate 215 is increased by the factor $\alpha$ (e.g., $\alpha<1$) of the estimated available bandwidth $BW_{est}$ to accommodate measurement inaccuracies and/or differences in TCP time scales. The example flow rate controller 210 updates the window size w using the following mathematical expressions:

$$w=w+(\alpha*BW_{est}*RTT)/(w*packet\_size) \text{ if } BW_{est}>0 \quad \text{EQN (8)}$$

$$w=w+1/w \text{ if } BW_{est}=0 \quad \text{EQN (9)}$$

where RTT is the round trip time in seconds, and packet_size is the average packet size in bits.

While an example NF-TCP module 125, an example congestion detection module 130, an example congestion notification module 140 and/or, more generally, an example communication system 100 implementing NF-TCP are illustrated in FIGS. 1 and 2, one or more of the elements, processes and/or devices illustrated in FIGS. 1 and 2 may be combined, divided, re-arranged, omitted, eliminated and/or implemented in any other way. Further, the example NF-TCP module 125, the example congestion detection module 130, the example congestion notification module 140, the example congestion detector 205, the example flow rate controller 210 and/or the example bandwidth estimator 220 of FIGS. 1 and 2 may be implemented by hardware, software, firmware and/or any combination of hardware, software and/or firmware. Thus, for example, any of the example NF-TCP module 125, the example congestion detection module 130, the example congestion notification module 140, the example congestion detector 205, the example flow rate controller 210 and/or the example bandwidth estimator 220 could be implemented by the example processor platform P100 of FIG. 7 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example NF-TCP module 125, the example congestion detection module 130, the example congestion notification module 140, the example congestion detector 205, the example flow rate controller 210 and/or the example bandwidth estimator 220 are hereby expressly defined to include a tangible article of manufacture such as a tangible computer-readable medium storing the firmware and/or software. Further still, any of the example NF-TCP module 125, the example congestion detection module 130 and/or the example congestion notification module 140 may include one or more elements, processes and/or devices in addition to, or instead of, those illustrated in FIGS. 1 and 2, and/or may include more than one of any or all of the illustrated elements, processes and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 4. As used herein, the term non-transitory computer-readable medium is expressly defined to include any type of computer-readable medium and to exclude propagating signals.

FIGS. 4 and 5 are flowcharts representing example processes that may be embodied as machine-accessible instructions and executed by, for example, one or more processors to implement the example NF-TCP module 125 of FIGS. 1 and 2. FIG. 6 is a flowchart representing an example process that may be embodied as machine-accessible instructions and executed by, for example, one or more processors to implement the example congestion detection module 130 of FIG. 1. A processor, a controller and/or any other suitable processing device may be used, configured and/or programmed to execute the example machine-readable instructions represented in FIGS. 4-6. For example, the machine-readable instructions of FIGS. 4-6 may be embodied in coded instructions stored on a tangible computer-readable medium. Machine-readable instructions comprise, for example, instructions that cause a processor, a computer and/or a machine having a processor to perform one or more particular processes. Alternatively, some or all of the example processes of FIGS. 4-6 may be implemented using any combination(s) of ASIC(s), PLD(s), FPLD(s), FPGA(s), discrete logic, hardware, firmware, etc. Also, some or all of the example processes of FIGS. 4-6 may be implemented manually or as any combination of any of the foregoing techniques, for example, any combination of firmware, software, discrete logic and/or hardware. Further, many other methods of implementing the example operations of FIGS. 4-6 may be employed. For example, the order of execution of the blocks may be changed, and/or one or more of the blocks described may be changed, eliminated, sub-divided, or combined. Additionally, the blocks of any or all of the example processes of FIGS. 4-6 may be carried out sequentially and/or carried out in parallel by, for example, separate processing threads, processors, devices, discrete logic, circuits, etc.

The example machine-accessible instructions of FIG. 4 begin with source node 105 setting up a NF-TCP flow with the destination node 110 (block 405). The example bandwidth estimator 220 performs bandwidth probing to measure, compute and/or estimate the available bandwidth $BW_{est}$ (block 410). The bandwidth estimator 220 may estimate the available bandwidth $BW_{est}$ by, for example, carrying out the example machine-accessible instructions of FIG. 6 FIG. 5. If there is bandwidth available (i.e., $BW_{est}>0$) (block 415), the flow rate controller 210 selects and/or computes an initial TCP window (block 420). For example, the flow rate controller 210 selects $w=\alpha*BW_{est}*RTT/packet\_size$.

The example source node 105 begins sending NF-TCP packets based on the selected window size w (block 425). If a congestion indication is not received for the NF-TCP packets (block 430), the flow rate controller 210 increases the window size w by, for example, one (block 435). If it is time to perform another bandwidth probe (block 440), control returns to block 410 to perform another bandwidth probe. If it is not time to perform another bandwidth probe (block 440), control returns to block 425 to continue sending NF-TCP packets.

Returning to block 430, if a congestion indication is received for the NF-TCP packets (i.e., an early congestion indication) (block 430), the flow rate controller 210 decreases the window size w by, for example, b=12.5% (block 445), and control proceeds to block 440 to determine whether it is time to perform another bandwidth probe.

The example machine-accessible instructions of FIG. 5 may be executed to, for example, perform the bandwidth probing at block 410 of FIG. 4. The example machine-accessible instructions of FIG. 5 begin with the example bandwidth estimator 220 selecting an initial probing rate (e.g., two packets per TCP window for an initial bandwidth probing) (block 505). The bandwidth estimator 220 begins sending the NF-TCP bandwidth probe packets 225 (block 510). If congestion detected indication is received (block 515), the bandwidth estimator 220 computes an estimate of the available bandwidth $BW_{est}$ using, for example, EQN (4)-(6) (block 525). Control then exits from the example machine-accessible instructions of FIG. 5.

Returning to block 515, if a congestion detected indicator is not received (block 515), the bandwidth estimator 220 increases the probing rate (block 520) and control returns to block 510 to continue sending the probe packets 510.

The example machine-accessible instructions of FIG. 6 may be executed to, for example, implement the example congestion detection module 130 of FIG. 1. The example machine-accessible instructions of FIG. 6 begin when the example router 120 receives a packet. If the received TCP packet is a NF-TCP bandwidth probe packet (block 605), the congestion detection module 130 compares the instantaneous depth of the queue 135 to the threshold $Q^P_{min}$ (e.g., having a value of one) (block 610). If the instantaneous queue depth is greater than the threshold $Q^P_{min}$ (block 610), the congestion detection module 130 marks the NF-TCP bandwidth probe packet by, for example, setting the CONGESTION_DETECTED header flag of the probe packet (block 615). The marked NF-TCP probe packet is forwarded toward the destination node 110 (block 620). Control then exits from the example machine-accessible instructions of FIG. 6.

Returning to block 610, if the queue depth is not greater than the threshold $Q^P_{min}$ (block 610), the congestion detection module 130 forwards the received NF-TCP probe packet toward the destination node 110 without marking the packet (block 620). Control then exits from the example machine-accessible instructions of FIG. 6.

Returning to block 605, if the received packet is a NF-TCP data packet (block 605), the congestion detection module 130 compares the average depth of the queue 135 to the threshold $Q^N_{min}$ (block 625). If the average depth of the queue 135 exceeds the threshold $Q^N_{min}$, the congestion detection module 130 selects the probabilistic rate at which NF-TCP data packets are marked/dropped as depicted in FIG. 3 (block 630). Based on the selected probabilistic rate, the congestion detection module 130 drops or marks the NF-TCP packet as specified in the router's policy (block 635). A packet that is marked is forwarded to the destination node 110 (block 640). Control then exits from the example machine-accessible instructions of FIG. 6.

Returning to block 635, if the average queue depth is not greater than $Q^N_{min}$ (block 635), the congestion detection module 130 forwards the received NF-TCP data packet toward the destination node 110 without marking the packet (block 640). Control then exits from the example machine-accessible instructions of FIG. 6.

Returning to block 605, if the received packet is a non NF-TCP data packet (block 605), the congestion detection module 130 compares the average depth of the queue 135 to the threshold $Q^T_{min}$ (block 650). If the average depth of the queue 135 exceeds the threshold $Q^T_{min}$, the congestion detection module 130 selects the probabilistic rate at which non NF-TCP data packets are marked/dropped as depicted in FIG. 3 (block 655). Based on the selected probabilistic rate, the congestion detection module 130 drops or marks the non NF-TCP packet as specified in the router's policy (block 660). A packet that is marked is forwarded to the destination node 110 (665).

Returning to block 660, if the average queue depth is not greater than $Q^T_{min}$ (block 660), the congestion detection module 130 forwards the received non NF-TCP packet toward the destination node 110 without marking the packet (block 665). Control then exits from the example machine-accessible instructions of FIG. 6.

Figure 7:
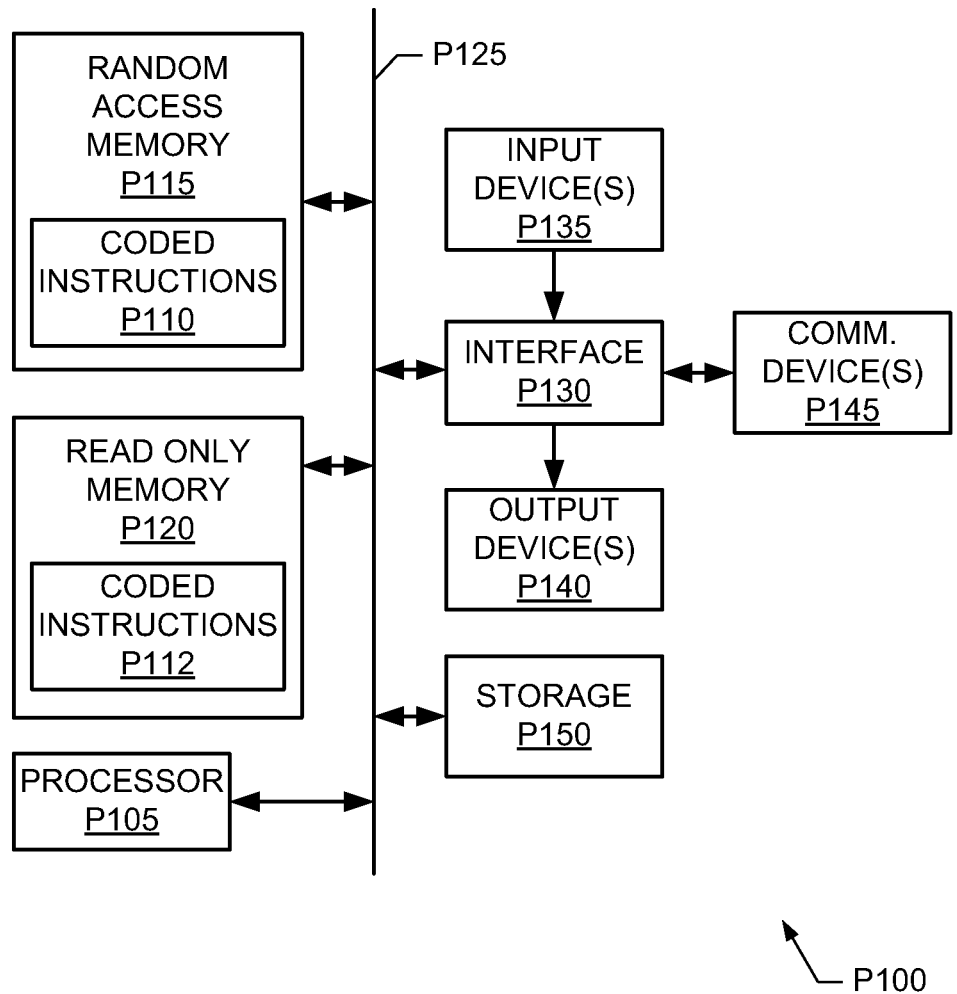
FIG. 7 is a schematic illustration of an example processor platform that may be used and/or programmed to execute the example machine-accessible instructions represented by FIGS. 4-6 to implement network-friendly TCP.

FIG. 7 is a block diagram of an example processor platform P100 capable of executing the example instructions of FIGS. 4-6 to implement the example NF-TCP module 125, the example congestion detection module 130, the example congestion notification module 140, the example congestion detector 205, the example flow rate controller 210 and/or the example bandwidth estimator 220 of FIGS. 1 and 2. The example processor platform P100 can be, for example, a router, a PC, a workstation, a residential gateway, a set-top box, a smartphone, a laptop, a netbook, a tablet PC, a game console, a server, and/or any other type of computing device containing a processor.

The processor platform P100 of the instant example includes at least one programmable processor P105. For example, the processor P105 can be implemented by one or more Intel® microprocessors from the Pentium® family, the Itanium® family or the XScale® family. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIGS. 4-6 to implement NF-TCP. Thus, the coded instructions P110, P112 may include the example instructions of FIGS. 4-6.

The processor P105 is in communication with the main memory including the non-volatile memory P110 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P110 may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

The interface circuit P130 may also includes one or more communication device(s) 145 such as a network interface card to facilitate exchange of data with other nodes and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive and/or any other solid-state, magnetic and/or optical storage device. The example storage devices P150 may be used to, for example, store the example coded instructions of FIGS. 4-6.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
sending first bandwidth probe packets at a first probing rate, the first probing rate being a different parameter than a data packet transmission rate at which data packets are sent, the first bandwidth probe packets being a different type of packet than the data packets;
in response to receiving a first packet containing a first indication that the first bandwidth probe packets triggered first congestion, estimating a first available bandwidth for the data packets based on the first probing rate and the first indication;
selecting a value for the data packet transmission rate based on a percentage of the first estimated available bandwidth;
sending second bandwidth probe packets at a second probing rate;
in response to receiving a second packet containing a second indication that the second bandwidth probe packets triggered second congestion, estimating a second available bandwidth for the data packets based on the second probing rate; and
adjusting the data packet transmission rate based on the second estimated available bandwidth.

2. The method as defined in claim 1, wherein:
the first bandwidth probe packets comprise transmission control protocol packets;
the received first packet comprises an acknowledgement transmission control protocol packet; and
the first indication comprises an explicit congestion notification, the explicit congestion notification being set when a random early detection queue of a router contained more than a threshold number of packets in response to the first bandwidth probe packets.

3. The method as defined in claim 1, further comprising sending the data packets at the selected value of the data packet transmission rate, wherein adjusting the data packet transmission rate based on the second estimated available bandwidth comprises decreasing the data packet transmission rate in response to the second indication that the second congestion was triggered.

4. The method as defined in claim 3, further comprising increasing the data packet transmission rate in response to receiving a third indication that the second congestion was not triggered.

5. The method as defined in claim 4, wherein the data packet transmission rate is increased by increasing a transmission window size by a number of packets.

6. The method as defined in claim 3, wherein decreasing the data packet transmission rate comprises decreasing the data packet transmission rate to a second percentage of the selected data packet transmission rate.

7. The method as defined in claim 1, wherein estimating the first available bandwidth comprises determining a number of the first bandwidth probe packets sent before receiving the first indication.

8. The method as defined in claim 1, wherein the second probing rate for second bandwidth probe packets is calculated based on the first estimated available bandwidth.

9. An apparatus comprising:
memory having machine readable instructions stored thereon;
a processor to execute the instructions to perform operations comprising:
sending first bandwidth probe packets at a first probing rate, the first probing rate being a different parameter than a data packet transmission rate at which data packets are sent, the first bandwidth probe packets being a different type of packet than the data packets;
in response to receiving a first packet including a first indication that the first bandwidth probe packets triggered congestion, estimating a first available bandwidth for the data packets based on the first probing rate and the first indication;
selecting a value for the data packet transmission rate based on a percentage of the first estimated available bandwidth;
sending second bandwidth probe packets at a second probing rate;
in response to receiving a second packet containing a second indication that the second bandwidth probe packets triggered second congestion, estimating a second available bandwidth for the data packets based on the second probing rate; and
adjusting the data packet transmission rate based on the second estimated available bandwidth.

10. The apparatus as defined in claim 9, wherein:
the first bandwidth probe packets comprise transmission control protocol data packets;
the received first packet comprises an acknowledgement transmission control protocol packet; and
the first indication comprises an explicit congestion notification flag, the explicit congestion notification flag having a first value when a queue of a router contained more than a threshold number of packets in response to the first bandwidth probe packets, the explicit congestion notification flag having a second value when the queue of the router contained less than the threshold number of packets in response to the first bandwidth probe packets.

11. The apparatus as defined in claim 9, wherein the operations further comprise sending the data packets at the selected value of the data packet transmission rate, wherein adjusting the transmission rate based on the second estimated available bandwidth comprises decreasing the data packet transmission rate in response to the second indication that the second congestion was triggered.

12. The apparatus as defined in claim 11, wherein the operations further comprise increasing the data packet transmission rate in response to a third indication that the second congestion was not triggered.

13. The apparatus as defined in claim 12, wherein the operations further comprise increasing the data packet transmission rate by increasing a transmission window size by one packet.

14. The apparatus as defined in claim 11, wherein decreasing the data packet transmission rate comprises decreasing the data packet transmission rate to a second percentage of the selected data packet transmission rate.

15. A tangible computer-readable storage medium comprising instructions that, when executed, cause a machine to perform operations comprising:
- sending first bandwidth probe packets at a first probing rate from a network node, the first probing rate being a different parameter than a data packet transmission rate at which the network node is to send data packets, the first bandwidth probe packets being a different type of packet than the data packets;
- in response to receiving a first packet containing a first indication that the first bandwidth probe packets triggered first congestion, estimating a first available bandwidth for the data packets based on the first probing rate and the first indication;
- selecting a value for the data packet transmission rate of the network node based on a percentage of the first estimated available bandwidth; and
- sending second bandwidth probe packets at a second probing rate;
- in response to receiving a second packet containing a second indication that the second bandwidth probe packets triggered second congestion, estimating a second available bandwidth for the data packets based on the second probing rate; and
- adjusting the transmission rate for sending second data packets based on the second probing rate and the second indication.

16. The storage medium as defined in claim 15, wherein:
- the first bandwidth probe packets comprise transmission control protocol packets;
- the first received packet comprises an acknowledgement transmission control protocol packet; and
- the first indication comprises an explicit congestion notification, the explicit congestion notification being set when a random early detection queue of a router contained more than a threshold number of packets in response to the first bandwidth probe packets.

17. The storage medium as defined in claim 15, wherein the operations further comprise sending the data packets at the selected value of the data packet transmission rate, wherein adjusting the data packet transmission rate based on the second estimated available bandwidth comprises decreasing the data packet transmission rate in response to the second indication that the second congestion was triggered.

18. The storage medium as defined in claim 17, wherein the operations further comprise increasing the data packet transmission rate in response to a third indication that the second congestion was not triggered.

* * * * *